UNITED STATES PATENT OFFICE.

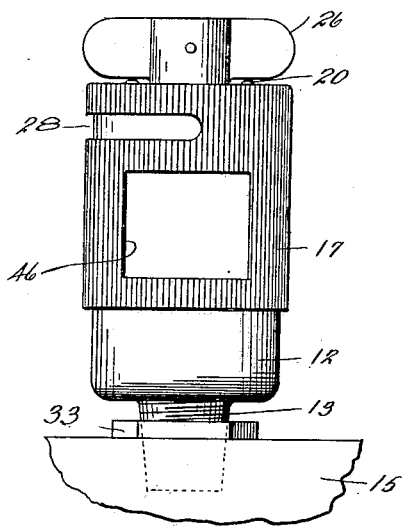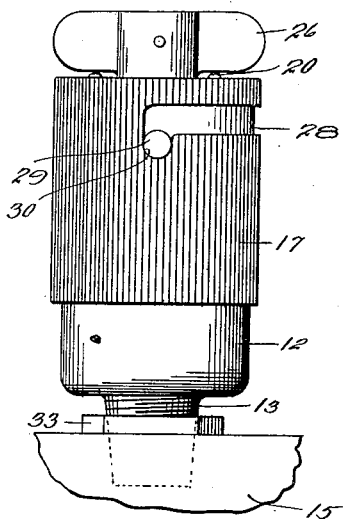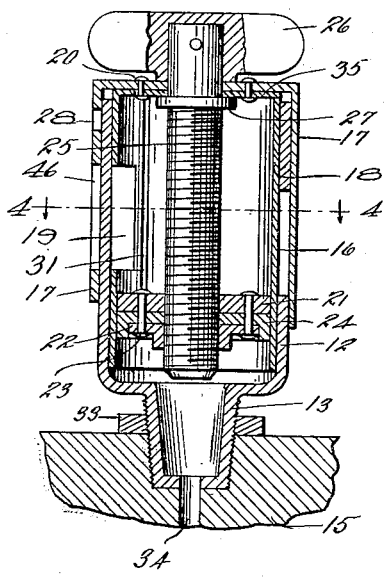

KENNETH F. LEES, OF NEW HAVEN, CONNECTICUT.

GREASE-CUP.

1,207,304.  Specification of Letters Patent.  Patented Dec. 5, 1916.

Application filed June 7, 1916. Serial No. 102,226.

*To all whom it may concern:*

Be it known that I, KENNETH F. LEES, a citizen of the United States, residing at New Haven, in the county of New Haven and State of Connecticut, have invented or discovered certain new and useful Improvements in Grease-Cups, of which the following is a specification, reference being had therein to the accompanying drawing.

This invention relates to grease cups for use in connection with machinery bearings for the purpose of supplying lubricant thereto, particularly lubricant in the form of heavy or semi-solid grease, and has for its general object the provision of an improved grease cup of the type capable of being filled from the side without the complete removal of the cap or other component part of the cup, thereby providing for increased convenience in filling and obviating the danger of loss or misplacement of the part or parts removed.

Another object of the invention is the provision of a grease cup in which the lubricant will be securely retained against all possibility of leakage, and in which the construction is such that the greater the internal pressure the tighter will be all joints through which lubricant might tend to escape.

A further object of the invention is the provision of a grease cup having no screw threads capable of becoming damaged by use, said cup, moreover, being provided with positive means for locking the same in closed condition, and said locking means being of such a character that the greater the internal pressure the more securely will the locking be accomplished.

The foregoing and other objects of the invention, together with means whereby the same may be carried into effect, will best be understood from the following description of one form or embodiment thereof illustrated in the accompanying drawings. It will be understood, however, that the particular construction described and shown has been chosen for illustrative purposes merely, and that the invention, as defined by the claims hereunto appended, may be otherwise practised without departing from the spirit and scope thereof.

In said drawing: Figures 1 and 2 are side elevations, looking from opposite sides, respectively, of the grease cup, showing the same closed and locked. Fig. 3 is a central vertical section taken substantially on the line 3—3, Fig. 4. Fig. 4 is a transverse section taken substantially on the line 4—4, Fig. 3.

The grease cup herein shown is in the nature of a further modification of the grease cup shown and described in my application for Letters Patent filed April 3, 1916, Serial No. 88,499, one modification of which is shown in my application filed herewith, Serial No. 102,225, and such features of the present cup as are disclosed in either of said other applications are not claimed herein, being covered by the claims of one or the other of said applications.

The grease cup constituting the present invention comprises a cylindrical body member 12 having an open outer or upper end and a closed inner or lower end provided with a nipple 13, said nipple having a central bore 14 constituting a discharge opening. The nipple 13 is provided with exterior screw threads to engage, in the usual manner, the interior threads of a suitable opening 34 in the bearing 15, with which opening said bore 14 communicates. The body 12 is provided with a lateral filling opening 16 which, when the cup is closed, is covered by the cylindrical portion of a cap member 17, which cap member also closes the open outer end of said body member. Within said body 12 is a sleeve 18 having a lateral opening 19 which, when the cup is opened, is adapted to register with the filling opening 16 in the body 12, said sleeve, as herein shown, having an end or head 35 rigidly connected with the cap 17, as by rivets 20. The cap 17 is provided with a lateral opening 46 adapted, when the cup is opened, to register with the filling opening 16 in the body 12, said opening 46 being opposite, or in a position corresponding to the opening 19 in the sleeve 18.

Slidably mounted within the sleeve 18 is a plunger or piston which, as herein shown, comprises a pair of metallic washers 21 and 22, permanently secured together by rivets 23, and clamping between them a leather or other flexible washer 24 forming a tight joint with the sleeve 18. The plunger is moved longitudinally of the cup, to force the grease therefrom through the discharge opening 14, by means of a stem or spindle 25 in threaded engagement with the plunger washer 22 and journaled in central openings in the end of the cap 17 and in the head 35 of the sleeve 18. The spindle 25 is operable from the exterior of the cup by means of a suitable handle or key 26 having a hub pinned or otherwise secured to the outer end of said spindle, and is held against longitudinal movement with respect to the cap 17 and sleeve 18 by engagement of the hub of said handle with the exterior of said cap and engagement of an annular flange 27 on said spindle with the interior of the head 35 of the sleeve 18. The sleeve and plunger are connected by suitable means permitting relative longitudinal movement while holding said plunger against rotation with respect to said sleeve. As herein shown, said means comprises a longitudinal slot 31 in the sleeve 18 which receives a lug 32 on the plunger washer 21, said slot also performing another function as hereinafter explained.

The cap 17 engages the exterior of the body 12 with a close sliding fit, while the sleeve 18 engages the interior of said body with a similar fit. Said cap and sleeve, which, as above described, are rigidly connected by the rivets 20, are adapted to rotate in unison upon said body. The cap 17 is formed, above the opening 46, with a circumferential slot 28 which receives a stud 29 projecting from the exterior of the body 12, whereby said cap is guided for rotary movement on said body while being held against axial movement thereon, said slot being of a length to provide for an angular movement of approximately 180°. Engagement of the stud 29 with the slot 28 prevents complete separation of the cap from the body at any time. At the inner or lower side of the slot 28, adjacent the end thereof occupied by the stud 29 when the cup is closed, is a notch 30 adapted to receive said stud and thereby lock said cup in closed position by resisting turning of the cap on the body.

The sleeve 18 is preferably formed of relatively thin stock and is so connected with the cap 17 that when said cap is turned to open the cup, the openings 19 and 46 in the sleeve and cap are both brought into register with the filling opening 16 in the body 12. When the cap is turned into the closed position, as shown in the drawings, the openings 19 and 46 both occupy a position, circumferentially of the cup, diametrically opposite the opening 16, although slightly above the same axially of the cup, due to the engagement of the pin 29 in the notch 30, said openings 19 and 46 being separated from each other by the wall of the body 12.

In order that the cup as a whole may be held in an angular position in which the filling opening 16 is most conveniently accessible, as also to prevent said cup from jarring loose from the bearing, there is provided on the threaded nipple 13 a lock nut 33 engaging the surface of the bearing 15.

To open the cup for filling, the spindle 25 is operated by the handle 26 to carry the plunger to its outermost position, and the cap 17 is turned to bring the openings 19 and 46 into register with the opening 16. Lubricant is thereupon introduced through the openings 46, 16, and 19 until the cup is completely filled, whereupon the cap 17 is rotated or turned circumferentially into closing position, substantially as shown in the drawings. Thereafter, if necessary, the cap 17 is given a slight outward pull to cause the stud 29 to enter the notch 30, thereby locking the cup in closed position. Under ordinary circumstances, however, it is found that the pressure exerted by the grease on the interior of the cup when the latter is closed is sufficient to cause said stud to enter said notch, and in this connection it is to be observed that the greater the internal pressure upon the cup the tighter will the stud 29 be held in the notch 30, and the more securely will the cup be locked in closed position.

In devices of this character considerable pressure is frequently required in order to force the lubricant into the bearing, particularly when the latter is badly clogged up, and, in grease cups as heretofore constructed, considerable difficulty has been encountered in preventing the escape of lubricant through the joints of the cup when subjected to this pressure. In the present cup, however, the sleeve 18, body 12, and cap 17 coöperate to provide a multiple seal against the escape or leakage of the lubricant from the cup. In order to escape from the cup, when closed, it would be necessary for said lubricant to travel through approximately 180° circumferentially of the cup, from the opening 19 to the opening 16, and between the sleeve 18 and body 12, and thereafter escape from beneath the cap 17 between the same and the body. If the parts be properly fitted, it is found that this provision is amply sufficient to prevent escape of lubricant, even when the latter is placed under considerable pressure by the action of the plunger. It will, however, be observed that, by reason of the slot 31 in the sleeve 18, as also by reason of the thin and rather flexible stock of which said sleeve is composed, this sleeve is rendered expansible, so that under internal pressure it is forced into closer engagement with the interior of the body 12, thereby further resisting the escape of lubricant, this resistance being increased in proportion to the increase in the internal pressure tending to cause such escape.

It will be seen that the device has no screw threads which are likely to become damaged or worn and thereby interfere with the proper operation. The only screw threads employed in the device are those on the nipple 13 which, however, under normal conditions, is never removed after having once been screwed into place, and those on the spindle 25, which is always protected and lubricated. It will also be seen that the parts are all permanently connected or assembled, it being unnecessary and impossible completely to remove any of them under normal conditions of use, so that all danger of loss of loose parts, and all difficulty of replacement of such parts when removed, are entirely obviated.

Having thus described my invention I claim and desire to secure by Letters Patent:

1. A grease cup comprising a cylindrical body having a lateral filling opening, a member movably mounted on said body and having a lateral opening and a circumferential slot, and a stud projecting from said body and engaging said slot to guide said member for rotary movement on said body to bring said openings into and out of registration, there being a notch adjacent one end of said slot to receive said stud and lock the said member with the opening therein out of register with the opening in said body.

2. A grease cup comprising a body having a filling opening, a sleeve within said body and having an opening, and a member on the exterior of said body and having an opening, said sleeve and member being movable on said body to bring the openings therein into and out of register with said filling opening.

3. A grease cup comprising a cylindrical body having a lateral filling opening, a sleeve within said body having a lateral opening, said sleeve being rotatable to bring the opening therein into and out of register with the opening in said body, and a cap rotatably mounted on said body and operatively connected with said sleeve, said cap having a lateral opening opposite the opening in said sleeve.

4. A grease cup comprising a cylindrical body having an open outer end and a lateral filling opening, a sleeve rotatable within said body and having a lateral opening, a cap rotatably mounted on the exterior of said body and closing the outer end thereof, said cap having a lateral opening and a circumferential slot and being rigidly connected with said sleeve, and a stud projecting from said body and engaging said slot.

5. A grease cup comprising a body having a filling opening, an expansible sleeve within said body and having an opening, and a member on the exterior of said body and having an opening, said sleeve and member being movable on said body to bring the openings therein into and out of register with said filling opening.

In testimony whereof I affix my signature.

KENNETH F. LEES.

Copies of this patent may be obtained for five cents each, by addressing the "Commissioner of Patents, Washington, D. C."